United States Patent [19]

Melchior

[11] 4,440,153
[45] Apr. 3, 1984

[54] SOLAR CONCENTRATOR

[75] Inventor: Bernd Melchior, Remscheid, Fed. Rep. of Germany

[73] Assignee: Imchemie Kunststoff GmbH, Wermelskirchen, Fed. Rep. of Germany

[21] Appl. No.: 353,387

[22] Filed: Mar. 1, 1982

[30] Foreign Application Priority Data

Mar. 2, 1981 [DE] Fed. Rep. of Germany ....... 3107888

[51] Int. Cl.$^3$ ................................................ F24J 3/02
[52] U.S. Cl. .................................... 126/438; 136/246; 350/293
[58] Field of Search ................. 126/438, 439; 136/246; 350/288, 293

[56] References Cited

U.S. PATENT DOCUMENTS

| | | | |
|---|---|---|---|
| 4,120,565 | 10/1978 | Rabl et al. | 126/438 X |
| 4,143,233 | 3/1979 | Kapany et al. | 126/438 X |
| 4,235,224 | 11/1980 | Yarwood et al. | 126/438 |
| 4,326,012 | 4/1982 | Charlton | 126/439 X |

FOREIGN PATENT DOCUMENTS 509473 4/1980 Australia.

*Primary Examiner*—Samuel Scott
*Assistant Examiner*—Margaret A. Focarino
*Attorney, Agent, or Firm*—Karl F. Ross; Herbert Dubno

[57] ABSTRACT

A solar concentrator which comprises a solid block of a transparent material having a planar incident surface positioned to receive solar rays and, opposite this surface, a curved reflective surface so that the material of the block completely fills the space between these surfaces. At the incident surface an absorber is provided and the curvature of the reflective surface is such that it is at least partly parabolical and adapted to reflect solar rays traversing the body through the body again to the absorber.

12 Claims, 2 Drawing Figures

SOLAR CONCENTRATOR

FIELD OF THE INVENTION

The invention relates to a solar concentrator having a concave mirror which concentrates the sun's rays on an absorber surface arranged between the mirror and the sun.

BACKGROUND OF THE INVENTION

Solar concentrators, having round and cylindrical parabolic concave mirrors, which concentrate the sun's rays on an absorber surface from which the heat produced is transferred, are already known, see Matthofer, "Sonnenenergie", Umschau-Verlag, Frankfurt/M., 1976, page 256. These devices have many parts, are difficult to operate, are difficult to build and are very large and very costly to manufacture. The mirror surface becomes dirty very quickly and is difficult to clean and also becomes scratched through constant cleaning. The units cannot be produced by mass production techniques.

OBJECTS OF THE INVENTION

It is the object of this invention to provide a solar concentrator the mirror surface of which does not become soiled and the external parts of which can be easily cleaned.

It is a further object of the invention to provide a solar concentrator which is simple to construct and inexpensive to manufacture, and which specially in the direction of the main sun ray collecting area forms a compact structure.

It is also the object of the invention to provide a solar concentrator with units which can be arranged side by side in a space-saving manner and which uses the sun's radiation in an optimum manner per unit of surface area.

SUMMARY OF THE INVENTION

These objects are achieved according to the invention in that the mirror is formed of a solid block of transparent material the lower side of which has a convex shape and is provided with a reflecting coating and that in or on the upper side of the block there is provided the absorber surface.

This ensures that all optically active surfaces of the solar concentrator are arranged in a protective manner, i.e. both the mirror surface area as well as the absorber surface are protected by the transparent material so as not to become soiled and their optical quality is not changed. Only the smooth upper side of the block requires cleaning.

The solar concentrator is a compact unit whose parts cannot be moved with respect to each other thereby ensuring that the optimum distance and the exact adjustment is constantly maintained. The concentrator can also be easily arranged side by side with other similar concentrators so that large areas can be formed without creating large unused intermediate spaces.

An optimum concentration of the sun's rays is achieved in that the lower side in at least one section is parabolically shaped. If a concentration is to be achieved not only along a line, but also in a dotted pattern, the lower side must be paraboloidally shaped. An enlargement of the focal point to the size of the absorber surface used is achieved in that the lower side is parabolically or approximately parabolically shaped in section in the central region and the outer regions are curved to such an extent that the focal point is enlarged or extended.

A particularly simple operation and easy cleaning is achieved in that the upper surface of the block is arranged at right angles to the main direction of the sun's rays. In this respect it is also recommended that the upper side of the block is level with and at right angles to the parabola axis.

Preferably at least one cross section of the block is a parabola segment. An enlargement of the focal point is achieved in that the parabola segment at least in the two outer regions is slightly less curved than the exact shape of the parabola. A high optical quality is achieved in that the reverse side is provided with a mirror like coating, especially of vapor deposited silver.

In order to maintain the optical quality of the upper side, which can deteriorate as a result of external influences, especially through cleaning, it is proposed that the upper side be coated with a scratch-proof, thin transparent material.

Preferably the absorber surface is a solar cell (semiconductor photo element) or a balcked heat conductor element. An enlarged absorber surface and/or a smooth upper side is achieved in that the solar cell or the heat conductor element is embedded either partly or completely to the upper side of the block.

The arrangement of the solar concentrators side by side in a row without residual spaces is achieved by forming the peripheral areas of the flat upper side and thus the side edges of the block into a rectangle, square, five or six sided shape. This has the additional advantage of reducing the less efficient areas of the mirrors.

The solar concentrator achieves a particularly high degree of efficiency when the approximately parabolically shaped mirror surface deviates from the shape of the parabola to such an extent that at a lesser distance from the focal point with respect to the mirror surface the rays in cross section form the surface shape especially of the rectangular absorber surface, and that the absorber surface is arranged inside this distance.

A very small part of less effective mirror surfaces and thus a high degree of efficiency is achieved in that the flat upper surface is approximately rectangular in shape and lateral surfaces of the block, which are formed of parabolic segments, border on at right angles to the two longitudinal edges. This enables a plurality of blocks to be arranged side by side with the lateral surfaces contacting each other.

For securing of the blocks with respect to each other there is provided in or on the upper surface a duct, especially a duct which has a rectangular cross section, for transferring the heat, which is secured to the upper side of the absorber surfaces or the outer wall of which forms the absorber surfaces. Between the absorber surfaces and the duct there may be provided a heat conducting profile which is secured to the absorber surfaces and which holds the duct. This enables the blocks to be clamped to the duct so that these can be easily fitted and exchanged.

A particularly advantageous embodiment which makes special use of the compact construction is provided in that the side of the mirror facing the sun is covered by transparent material at a distance from the mirror or covers the mirror directly without leaving a space. This prevents not only heat losses on the absorber surface but also ensures in a simple manner that the mirror remains completely free of dirt, thereby requiring no regular cleaning and servicing of the mirror. This also protects the mirror from becoming damaged.

The transparent material can completely fill the hollow mirror, thus further simplifying the manufacturing process and further reducing the danger of damage.

The transparent material may be glass or a synthetic material and especially an acrylic sheet. The absorber surface or the solar cell can be arranged on or in the upper side of the transparent material, this providing additional support and simplifying manufacture and fitting. Especially the absorber surface can be incorporated in the upper side of the transparent material.

It is preferably proposed that between the absorber surface and the transparent material there is provided a second transparent material having a refractive index which is such that the sun's rays are refracted with respect to the absorber surface. The height of the concentrator can thus be further reduced and radiation striking at a very low angle can still reach the absorber surface. The second transparent material may thus be an adhesive agent for the absorber surface, especially a binding substance, so that this material performs a dual function.

A method for a simple and inexpensive manufacture of high precision, especially mass production, is achieved in that the strength (thickness) of the material is greater than the depth of the concave mirror. Furthermore, after removal the fresnel-shaped reverse side of the moulded article is provided with a reflective coating. Preferably the reverse side after being provided with a reflective coating is provided with a protective layer, especially a layer of lacquer.

SPECIFIC DESCRIPTION

Figure 1:
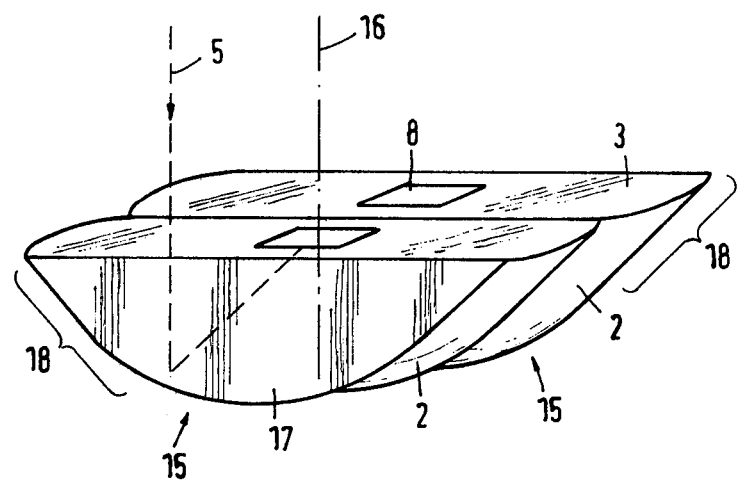
FIG. 1 an isometric view of two blocks with parabolic lower sides.

The solar concentrator (solar collector) comprises a block 15 of a transparent material such as a glass or a clear plastic, especially an acrylic, and has a convex lower side 2 and a flat, level upper side 3. The approximately rectangular upper side 3 in operation is at right angles to the main direction of the sun's rays so that the rays are reflected from the upper surface as little as possible. The upper side 3 is provided with a thin scratch-proof coating, The lower side is of parabolic shape at least with respect to a section which is at right angles to the upper side 3. Furthermore, the lower side 2 may be doubly curved so as to form a part of the paraboloid. The block may be formed of a segment or the dome of a paraboloid or it may be made from a slice of a paraboloid dome (segment) the parallel side surfaces of which are arranged parallel to the paraboloid axis and have the same distance from this axis. However, the surface of the upper side 3 is arranged at right angles to the paraboloid axis 16. Since the thickness of the slice is considerably less than the length of the upper side 3, these sliced segments can be placed side by side in a row so that the side surfaces 17 of the blocks 15 contact and cover each other.

The lower side 2 has a coating of silver vapor deposited upon it and thus forms a hollow mirror filled with the transparent material of the block and which reflects towards the absorber surface 8 the sun's rays collected within the material of the block. The absorber surface is formed by a solar cell (semiconductor photo element) or a blacked-out heat conductor element. The absorber surface 8 is arranged in the centre of axis 16 and at right angles to the same, but not precisely in the focal point of the hollow mirror, but opposite the focal point displaced with respect to the mirror in the direction of axis 16 so that the rays do not strike the absorber surface 8 at one point, but within the area. So that the area formed by the sun's rays corresponds to the absorber surface 8, in the case of a block formed of segments according to FIGS. 1 or 2 the outermost regions 18, which are at a further distance from the axis 16, are provided with a smaller radius of curvature than the exact shape of the parabola so that the surface which is struck by the sun's rays is extended in the longitudinal direction of the upper side 3 and thus takes on the shape approximately of the quadratic absorber surface 8. When the shape of the parabola is enlarged to such an extent it may not be necessary to place the absorber surface outside the focal point.

The block 15 need not necessarily be a disc which is parallel to the paraboloid axis, but may also be a quadratic, regular five sided or regular six sided cut away portion of a paraboloid or an elongated semicylinder, the upper side 3 then being quadratic, five sided or six sided and the side surfaces 17 at right angles contacting the sides of the upper side. The paraboloid axis 16 is thereby always situated in the center of the block and at right angles to the upper side. Blocks formed in this manner can be formed into larger surfaces by being placed next to each other without forming unused intermediate spaces.

Figure 2:
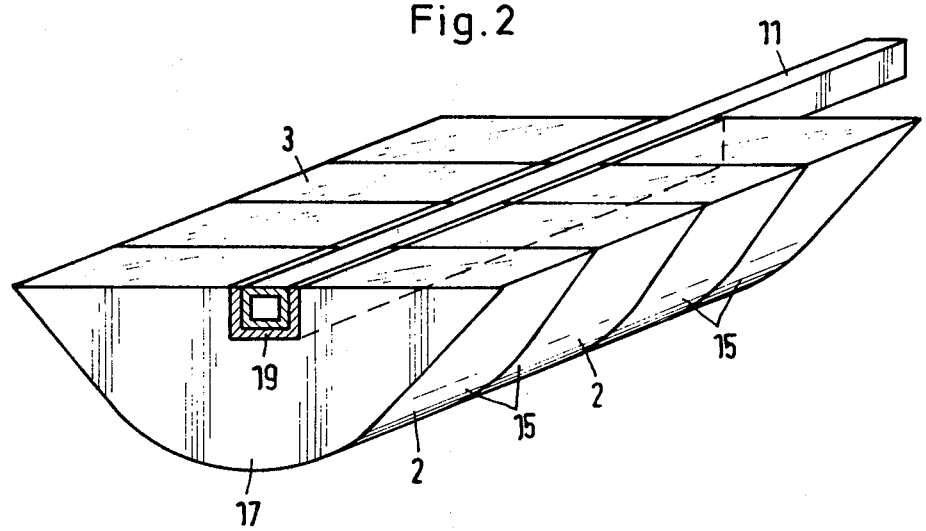
FIG. 2 is an isometric view of blocks having partly cylindrical lower sides.

The embodiment example shown in FIG. 2 is different from that according to FIG. 1 in that amongst other things a heat conducting U-profile 19 is incorporated in the upper side in such a way that the opening is on the top and the profile is arranged at right angles to the side surfaces 17. The outer sides of the U-profile form the absorber surfaces. A duct 11 is force fitted into the U-profile and the heat transfer medium is passed through the duct 11.

The disc-shaped blocks 15 according to FIG. 2 on their lower side are curved not twice, but only once, and therefore in cross section forms part of the parabolic discs. This shape is advantageous when the absorber surface extends over the entire thickness of the discs.

Acrylic is poured into a round, rectangular or partly cylindrical hollow meld the base of which extends outwards in a parabolic shape so that after removal, the reverse side of the moulded article has a parabolic arc. The lower side of the moulded article is provided with a reflective coating so that the sun's rays striking the upper side are reflected within the acrylic glass disc 4.

In cases where these rays 5 extend parallel to axis 16 of the parabola shape or extend parallel to a centre plane of a partly cylindrical concentrator, they are reflected towards the center and from there picked up by an absorber surface 8 which is formed by a solar cell (semiconductor photo element). The solar cell with its upper side acting as a photovoltaic means rests centrally on the upper side of an acrylic disc so that the reverse side of the solar cell faces the sun.

The concentrator can have the solar cell arranged in a recess on the upper side 3 of the acrylic body. A cup-shaped recess 10, or a groove-like recess, is larger than the dimensions of the solar cell, the base and the sides of the recess extending parallel to the surface and the sides of the solar cell. The intermediate space between the solar cell and the walls of the recess is filled with an acrylic glass, which has a different index of refraction from the acrylic of the acrylic body, which refracts the rays in the direction towards the absorber surface.

I claim:

1. A solar concentrator comprising at least one solid block of a transparent material having a planar incident surface and a curved reflective surface opposite said incident surface with said material completely filling the space between said surfaces whereby said surfaces bound said block, and an absorber in contact with said block at said incident surface, said absorber obstructing only a portion thereof, such that said incident surface intercepts solar rays which traverse said block, and said reflective surface being at least partly parabolical to reflect rays traversing said block to said absorber whereby said solar rays traverse only material of said block between said incident surface and said absorber.

2. The solar concentrator defined in claim 1 wherein said reflective surface has a central portion of parabolical shape and outer portions of a shape extending the focus of reflected solar rays beyond the focal point of said parabolical shape in the region of said incident surface.

3. The solar concentrator defined in claim 1 wherein at least one cross section of said block is a parabola segment.

4. The solar concentrator defined in claim 1 wherein said reflective surface is formed by a vapor deposited layer of silver on the exterior of said block.

5. The solar concentrator defined in claim 1 wherein said incident surface is formed with a scratch-proof layer of transparent material.

6. The solar concentrator defined in claim 1 wherein said absorber is a solar cell applied to said block at said incident surface.

7. The solar concentrator defined in claim 1 wherein said absorber includes a fluid-carrying duct at least partly received within said block.

8. The solar concentrator defined in claim 1 wherein said block has a pair of parallel flanks and said concentrator comprises a multiplicity of such blocks in mutually contacting relationship at said flanks without interstices between them.

9. The solar concentrator defined in claim 8 wherein said blocks define a groove, said absorbers of said blocks including a common duct at least partly received in said groove and carrying a heat-conducting medium.

10. The solar concentrator defined in claim 9, further comprising a heat-conducting material of U configuration between said duct and said groove, said duct being of rectangular cross section.

11. The solar concentrator defined in claim 1 wherein said material is an acrylic.

12. The solar concentrator defined in claim 1, further comprising a body of another material having a different refractive index from the first material adjacent said absorber, forming part of said body and reflecting rays onto said absorber.

* * * * *